United States Patent
Fukuda et al.

(10) Patent No.: US 6,490,236 B1
(45) Date of Patent: Dec. 3, 2002

(54) METHOD AND APPARATUS FOR OPTICAL DISK DEVICE

(75) Inventors: Yasushi Fukuda, Hitachinaka; Toshifumi Takeuchi, Yokohama; Nobuhiro Tokushuku, Katsura, all of (JP)

(73) Assignee: Hitachi, Ltd., Tokyo (JP)

( * ) Notice: Subject to any disclaimer, the term of this patent is extended or adjusted under 35 U.S.C. 154(b) by 122 days.

(21) Appl. No.: 09/654,178

(22) Filed: Sep. 1, 2000

(30) Foreign Application Priority Data

Apr. 4, 2000 (JP) ........................................ 2000-106690

(51) Int. Cl.[7] .............................................. G11B 20/18
(52) U.S. Cl. ................................ 369/53.35; 369/59.23; 369/59.26; 714/769
(58) Field of Search .......................... 369/59.23, 59.24, 369/59.25, 59.26, 124.07, 124.08, 53.35, 53.36, 47.18, 275.3; 714/764, 763, 769, 752, 755, 758, 774, 781

(56) References Cited

U.S. PATENT DOCUMENTS

| | | | | |
|---|---|---|---|---|
| 5,835,509 A | * | 11/1998 | Sako et al. ................... | 714/762 |
| 6,014,766 A | * | 1/2000 | Nagai et al. ................. | 714/770 |
| 6,158,038 A | * | 12/2000 | Yamawaki et al. .......... | 714/755 |
| 6,243,845 B1 | * | 6/2001 | Tsukamizu et al. ......... | 714/769 |
| 6,272,659 B1 | * | 8/2001 | Zook ........................... | 714/781 |
| 6,295,596 B1 | * | 9/2001 | Hirabayashi et al. ....... | 714/762 |
| 6,298,033 B1 | * | 10/2001 | Tanoue et al. ............ | 369/275.3 |
| 6,332,207 B1 | * | 12/2001 | Southerland et al. ....... | 714/763 |
| 6,363,511 B1 | * | 3/2002 | Massoudi ..................... | 714/769 |
| 6,378,103 B1 | * | 4/2002 | Han ............................. | 714/781 |

* cited by examiner

Primary Examiner—Thang V. Tran
(74) Attorney, Agent, or Firm—Townsend and Townsend and Crew LLP

(57) ABSTRACT

In playing back data in an optical disk device, to perform high-speed data playback with a low number of playback retries even if an error occur when data is being read. In reading data composed of ECC blocks, if a data error occurs during a read operation, the data from sectors for which PI error correction can be performed is left alone. Playback retries using different playback conditions are performed just on the sectors for which PI error correction can be performed. Thus, the playback retry count can be reduced.

11 Claims, 8 Drawing Sheets

| FLG | Sector | data region | |
|---|---|---|---|
| 1 | 0 | data | P1 |
| | | P0 | |
| 0 | 1 | data | P1 |
| | | P0 | |
| 0 | 2 | data | P1 |
| | | P0 | |
| ⋮ | ⋮ | ⋮ | |
| 1 | 13 | data | P1 |
| | | P0 | |
| 0 | 14 | data | P1 |
| | | P0 | |
| 1 | 15 | data | P1 |
| | | P0 | |

METHOD AND APPARATUS FOR OPTICAL DISK DEVICE

CROSS-REFERENCES TO RELATED APPLICATIONS

The present application is related to and claims priority from Japanese Patent Application No. 00-106690, filed on Apr. 4, 2000.

BACKGROUND OF THE INVENTION

The present invention relates to an optical disk device playing back information from an optical information recording medium. More specifically, the present invention relates to a method for playing back data in the same.

Conventionally, various systems have been known and put in use regarding optical disk devices. In these optical disk devices, optically recorded information is read and played back. Information is recorded on optical information recording media by forming recording marks on a disc-shaped optical recording medium using concave and convex pits, phase changes, or the like. Recent years have seen development and attention placed on optical recording media such as those known as DVDs that provide higher information recording density and allow large amounts of information to be recorded. Some optical disk devices that can read and playback or record/playback recorded information from these disks are already commercially available.

In this type optical recording medium (hereinafter referred to as optical disks) such as DVD, ECC (Error Correction Code) blocks serve as the smallest unit for recording data. An ECC blocks is formed from 16 sectors (or frames) of 2048 bytes, providing a total capacity of 32 kbytes. Error correction is performed on these ECC blocks to assure data reliability. There are two types of error correction. PI correction corrects individual sectors and PO correction corrects 16-sector blocks. Improved error correction performance is provided by using both types of error correction.

In high-density recording media such as DVDs, laser beams with shorter wavelength compared to those from conventional optical disk devices such as CDs is used for optical playback means in order to increase information recording density on the disc-shaped medium. Track pitch density is also increased. Thus, concave and convex formations known as land regions and groove regions are formed on the recording surface of the medium, and information is recorded in these regions. These land regions and groove regions are alternated every time around based on the tracking operation performed by the optical pickup, which serves as optical playback means.

Various types of high-density recording media have been proposed such as recording media from which recorded information can only be played back, recording media which can only record once, and recording media which can be recorded a plurality of times.

Playback of data from the high-density recording media described above can be easily affected by various playback conditions such as focus and tracking. Errors can occur even with the error correction described above, and it is necessary to handle these.

Furthermore, since the smallest recording unit is large, as in the ECC block, playing back data from these smallest recording units on a high-density recording medium can result in difficulties in finding optimal playback conditions. This can result in multiple playback retries and long data read times.

The object of the present invention is to overcome the problems described above and to provide an optical disk device and a method for playing back data for the same that plays back data at high speeds with a low number of playback retries even if an error occurs during a data read.

SUMMARY OF THE INVENTION

The present invention provides a method for playing back data from an optical information recording medium. A data recording block that includes a first error correction code series and a second error correction code series serves as the smallest recording unit. The second error correction code series in the smallest recording unit is divided into a plurality of groups and recorded. When playing back data from the smallest recording unit, a second error correction is performed on the second error correction code series. Information regarding whether or not the error correction was possible for each of the plurality of groups when performing the error correction is stored. A first error correction is performed on the first error correction code series. Data from the groups for which the second error correction was possible is stored if the first error correction is not possible. Data of the smallest recording unit from the optical information recording medium is played back again. Error correction is performed on the groups for which the second error correction was not possible, and the first error correction is performed.

In this invention, ECC blocks are used as the smallest recording unit, PO correction is used for the first error correction, and PI correction is used for the second error correction.

In this invention, before playing back data again from the optical information recording medium, at least one of the following conditions is changed: focusing conditions, tracking conditions, playback sync signal detection conditions, playback equalizer conditions, data slide conditions, and speed conditions.

Alternatively, in order to achieve the objects described above, the present invention provides an optical disk device playing back data from an optical information recording medium. A data recording block that includes a first error correction code series and a second error correction code series serves as the smallest recording unit. The second error correction code series in the smallest recording unit is divided into a plurality of groups and recorded. Means for playing back data plays back data from the smallest recording unit. Means for performing second error correction performs a second error correction on the second error correction code series. Means for performing first error correction performs a first error correction on the first error correction code series. Means for storing error evaluations stores whether or not error correction was possible for each of the plurality of groups. Means for controlling performs the following control operations. When playing back data, playback means plays back data from the smallest recording unit in the optical recording medium. Second error correcting means performs the second error correction on the playback data. Error evaluation storing means stores whether or not error correction was possible on the plurality of groups. First error correcting means performs the first error correction. If the error correction is not possible, data from the groups for which the second error correction was possible is stored. Data from the smallest recording unit on the optical information recording medium is played back again. Error correction is performed on groups for which the second error correction was not possible. The first error correction is performed.

In the optical disk device of the present invention, ECC blocks are used as the smallest recording unit, PO correction is used for the first error correction, and PI correction is used for the second error correction.

Also, the optical disk device of the present invention includes: means for controlling optical head focus; means for controlling tracking; means for detecting playback sync signals; means for setting up playback equalizer; means for setting up data slices; and means for controlling a disk rotation motor. Before playing back data from the optical recording medium again, controlling means changes control conditions for at least one means selected from the group consisting of focus controlling means, tracking controlling means, playback sync signal detecting means, playback equalizer settings controlling means, data slice settings controlling means, and disk rotation motor controlling means.

BRIEF DESCRIPTION OF THE DRAWINGS

The teachings of the present invention can be readily understood by considering the following detailed description in conjunction with the accompanying drawings:

FIG. 9 is a figure showing the relationship of flags (FLG) and sectors for the purpose of describing an embodiment of the present invention.

DESCRIPTION OF THE EMBODIMENTS

The following is a description of the embodiments of the present invention, with references to the attached drawings.

Figure 1:
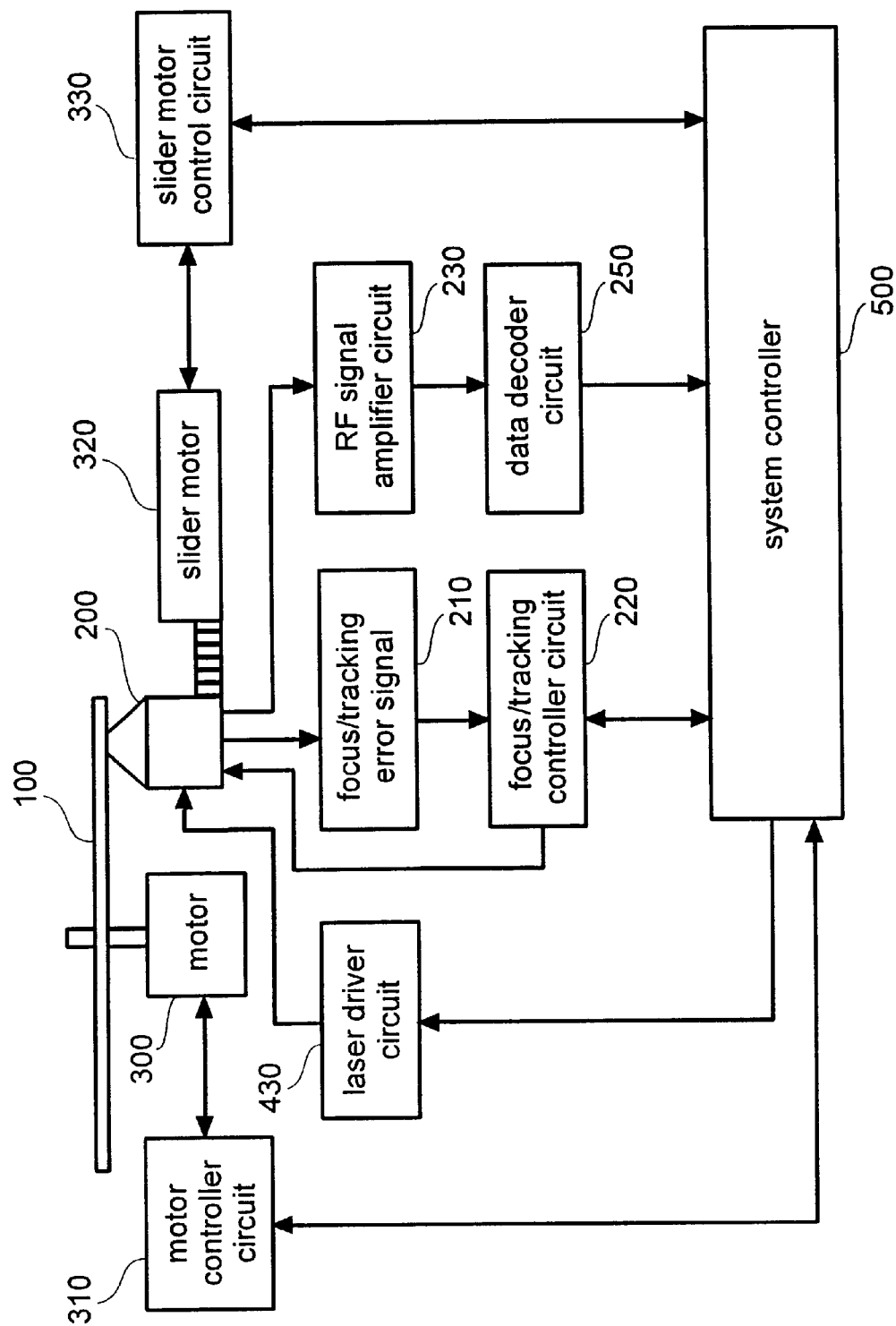
FIG. 1 is a block diagram of an optical disk device according to an embodiment of the present invention.

First, the schematic structure of an optical disk device according to the present invention will be described with reference to FIG. 1. FIG. 1 is a block diagram of an optical disk device that can read from and write to an optical information recording medium.

In FIG. 1, an optical disk 100 is a high-density information recording medium. An optical head 200 is internally equipped with a semiconductor laser used for recording or playing back, various types of lenses, a photodetector, and the like.

In this embodiment, information is recorded to or played back from the optical disk 100. Accurate focusing and tracking is provided by having a focus/tracking control circuit 220 control an object lens (not shown in the figure) based on a focus/tracking error signal 210 from the optical head 200. A system controller 500 issues instructions for various offsets for the optical head 200, land/groove switching, and the like.

The playback signal from the optical head 200 is amplified by an RF amplifier circuit 230 and is then sent by way of a data demodulation circuit 250 to the system controller 500 and is then played back as data. During data demodulation, a SYNC detector circuit (not shown in the figure) detects a sync signal to allow accurate demodulation of data.

The device of this embodiment also includes: a disk rotation motor 300; a motor controller circuit 310; a slider motor 320 for moving the optical head 200; and a slider motor controller circuit 330. These elements are all controlled by the system controller 500.

Figure 2:
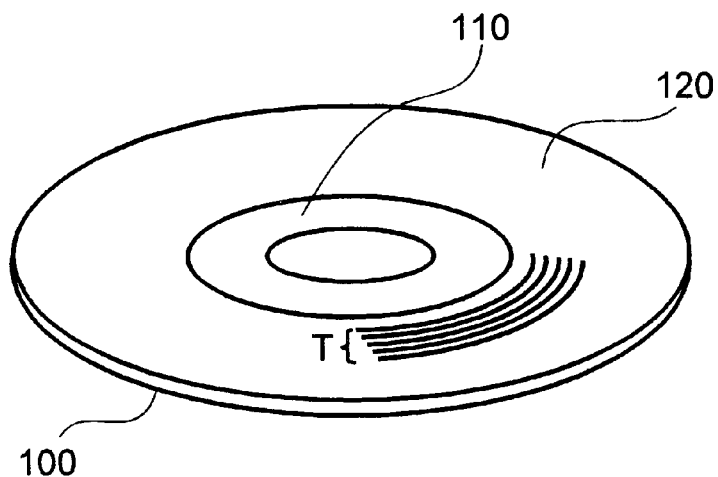
FIG. 2 is an exterior view drawings of a DVD disk, which is an optical disk from which information can be played back using an optical disk device according to an embodiment of the present invention.
Figure 2:
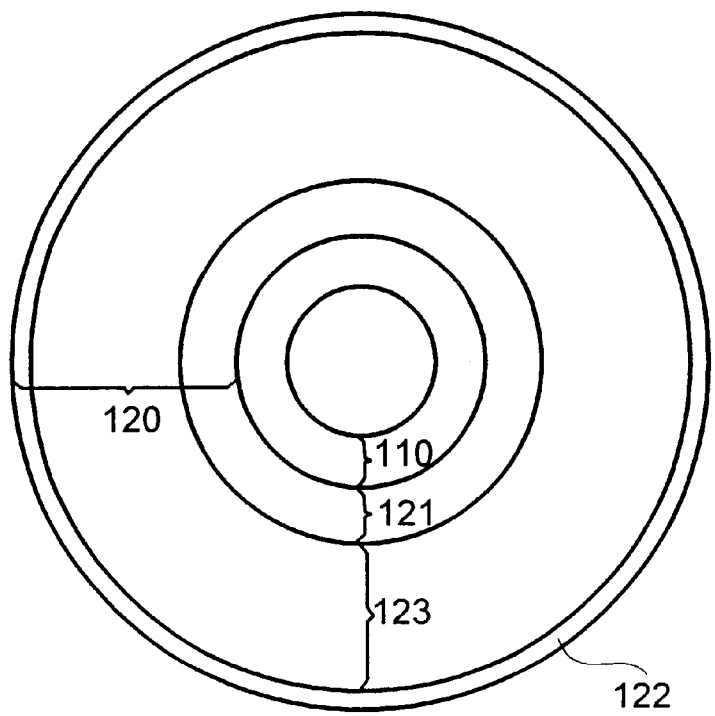

Next, an optical disk 100 that uses a high-density recording medium known as DVD- RAM will be described, with references to FIG. 2. FIG. 2 shows exterior view drawings of the optical disk 100 used for recording and playback of information by the optical disk device. FIG. 2(a) is a perspective drawing and FIG. 2(b) is a top-view drawing.

In such optical disks and in the recordable media known as DVD-RAM in particular, information can be written by applying a laser beam to create crystalline or non-crystalline marks on a recording layer on a transparent substrate, e.g., using phase changes. Then, by reading changes in the reflectivity of the crystalline or non-crystalline light resulting from the marks, information recorded on the optical disk 100 can be played back.

An example of the optical disk 100 shown in FIG. 2 is the recordable information storage medium known as DVD-RAM, mentioned above. As shown in FIG. 2, the optical disk 100 is divided into a ROM region 110 at the center and a surrounding RAM region 120. Predetermined control information (control data) and the like are stored in the ROM region 110. As shown in FIG. 2(b), in this type of optical disk the RAM region 120 information is recorded and read by dividing the information recording section into concave and convex regions known as lands and grooves formed along a spiral track T used for continuous recording of information on the disc. This is done to increase recording density.

Furthermore, the RAM region 120 is divided into a number of regions. Management regions 121, 122 are disposed at the inside and the outside of the RAM region 120 to manage information relating to device control. Between these is disposed a user region 123 used to read and write user information.

The management regions 121, 122 are divided into a disk test zone, a drive test zone, a defect information management zone, and the like (not shown in the figure). The drive test zone is also used as a writing area when performing pre-writes, described later. The defect information management zone is used to record defect management information for the disk and is known as a DMA region.

The user area 123 is formed from a plurality of radial regions (zones). Furthermore, each of these zones is divided into a plurality of sectors, with each sector formed from a PID region, in which a sector number is recorded beforehand, and a data recording region used for recording data.

Figure 3:
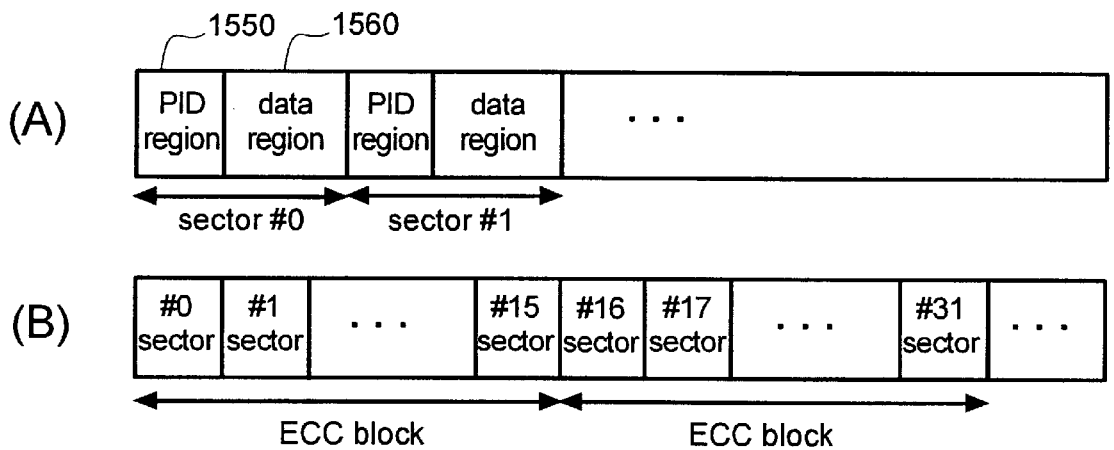
Figure 4:
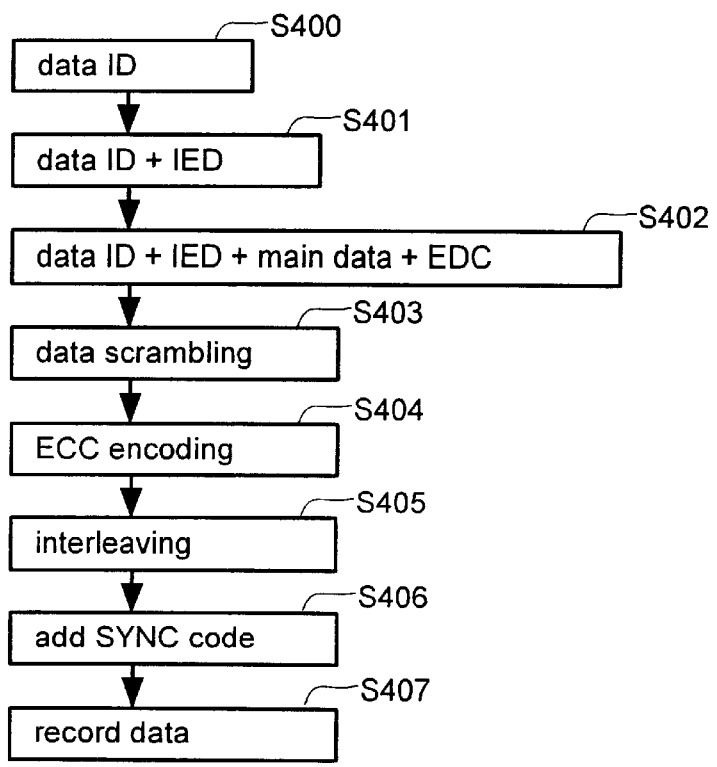
FIG. 4 is a drawing for the purpose of describing a method for generating recording data for recording to the DVD from FIG. 3.
Figure 5:
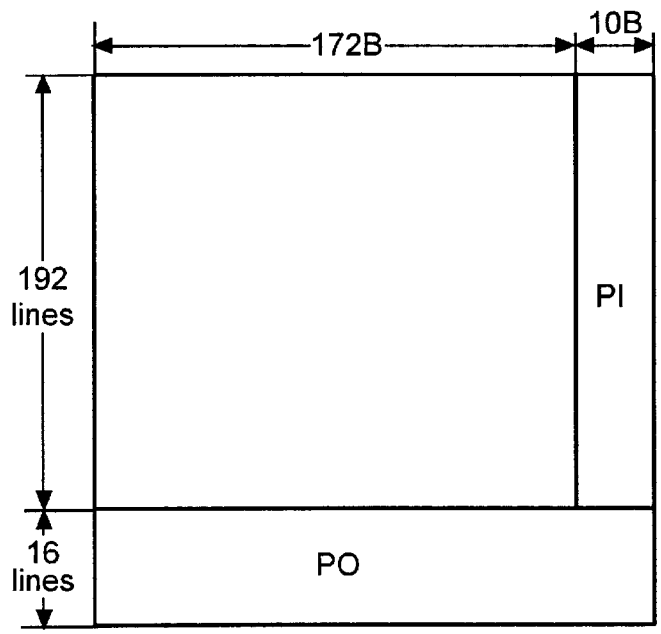
FIG. 5 is a drawing showing a data structure from after ECC encoding in the recording data generating process from FIG. 4.

The following is a description, with references to FIG. 3 through FIG. 5, of ECC blocks, which are the smallest recording units used in recording/playback with the optical disk 100. FIG. 3 is a drawing for the purpose of describing recording blocks in the optical disk 100. FIG. 4 is a flowchart for the purpose of describing a method used to generate recording data to be recorded to the optical disk. FIG. 5 shows an example of a data structure for recording data.

As shown in FIG. 4, with regard to the recording data recorded to the optical disk, an ID error detection code (IED) is added to a data ID (step S401), and then main data and error detection code (EDC) are added (step S402). Next, this data is scrambled (step S403), ECC encoded (step S404), and interleaved (step S405). SYNC code is then added, completing the recording data. This recording data block is an ECC block, and data is recorded to the optical disk by ECC blocks.

FIG. 5 shows the structure of an ECC block after the ECC encoding performed at step S404 described above. The ECC block contains 208 rows of 182 bytes of data. Of the 182 bytes, 10 bytes serve as an error code known as PI (inner binary code). Of the 208 rows, 16 rows serve as an error code known as PO (outer parity code). PI and PO together are referred to as the ECC error code.

Figure 6:
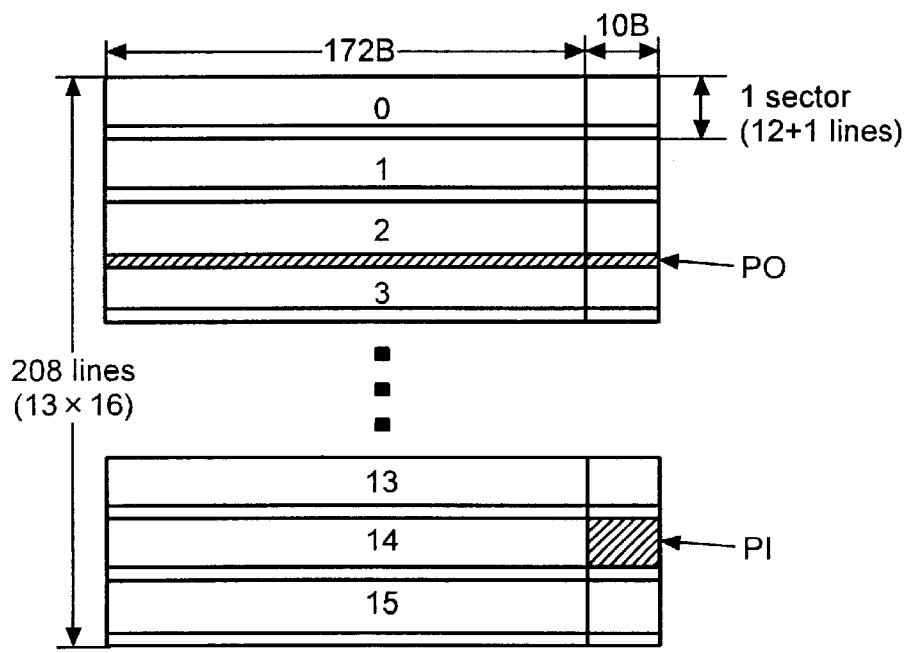
FIG. 6 is a drawing showing a data structure from after ECC encoding in the recording data generating process from FIG. 4.

FIG. 6 shows the structure of an ECC block after the interleaving performed at step S405. The 192 rows of data and 16 rows of PO are divided into 16 sections and combined into 12+1 row sets. When recording these to the optical disk, the 13 rows, formed from 12 rows of data and 1 row of PO, are recorded to one sector on the optical disk. Thus, recording one ECC block involves recording 16 sectors (13 rows×16 sectors=208 rows) to the optical disk.

The following is a detailed description of how information is recorded on the optical disk, with references to FIG. 3. FIG. 3(A) shows a track on the optical disk 100. As described above, a PID region 1550 and a data region 1560 are formed in each sector. The PID region 1550 is recorded beforehand with a sector number, and the ECC block and the sector number are recorded in the data region 1560. As FIG. 5(B) shows, 16 sectors form a single ECC block.

In a sector in an ECC block, the data size not including PI and PO is 172 bytes×12=2064 bytes. In this, the data ID is 4 bytes, the IED is 2 bytes, the reserve is 6 bytes, and the EDC is 4 bytes. So, subtracting these, the actual user data is 2048 bytes. Thus, the user data size in one ECC block is 2048 bytes×16=32768 bytes.

Figure 7:
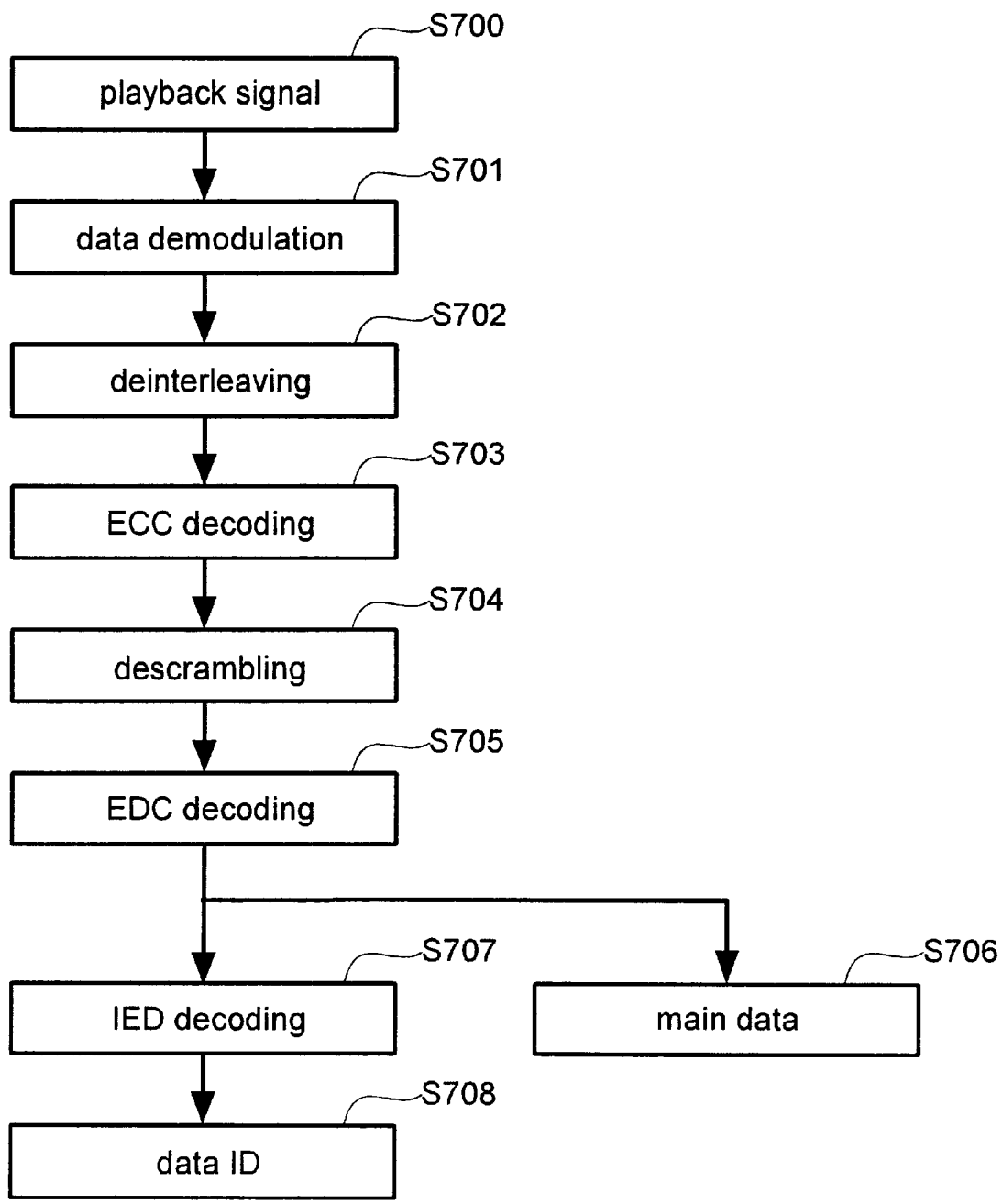
FIG. 7 is a drawing for the purpose of describing a method for playing back data from the DVD from FIG. 3.

The following, with references to FIG. 7, is a description of how data recorded to the optical disk as shown in FIG. 3 can be read. The data from the playback signal (step S700) from the optical disk is demodulated (step S701) to obtain ECC blocks of data as shown in FIG. 6. Next, this data is deinterleaved (step S702) to provide ECC block data as shown in FIG. 5. ECC decoding is then performed on this data (step S703), and the results are descrambled (step S704). EDC decoding is then performed (step S705) to obtain the main data (step S706). The data ID is obtained by performing IED decoding (step S707) after the ECD decoding.

Figure 8:
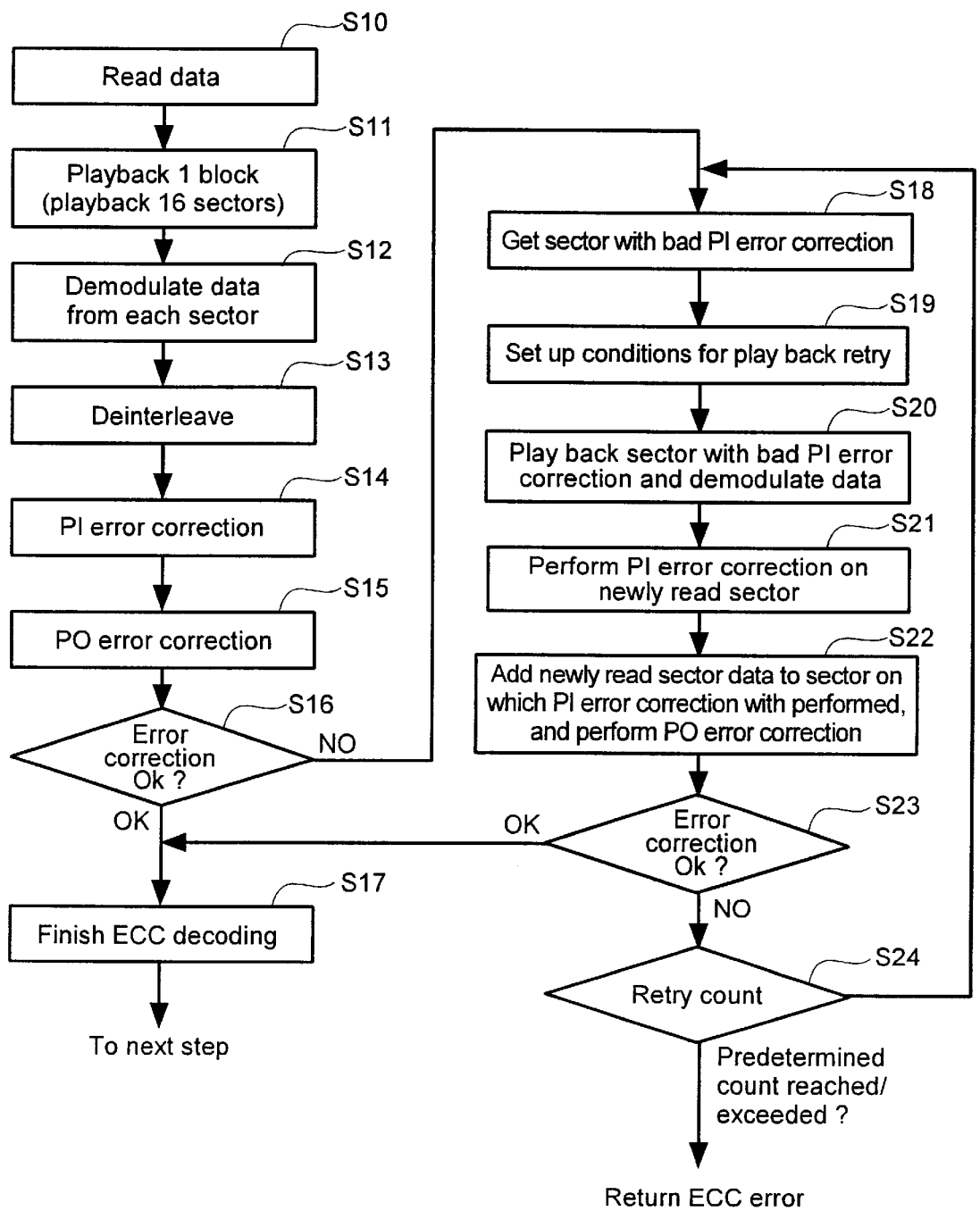
FIG. 8 is a flowchart of a method for playing back data used in an optical disk device according to an embodiment of the present invention.

The following, with references to FIG. 8 and FIG. 9, is a description of how data is played back from an optical disk according to an embodiment of the present invention.

FIG. 8 is a flowchart showing how data from the optical disk 100 is played back using an optical disk device according to an embodiment of the present invention.

Reading data from the optical disk 100 involves reading ECC blocks, so one ECC block (i.e., 16 sectors) is played back (step S11). Next, data is demodulated from each sector (step S12). Next, after deinterleaving (step S13), PI error correction (step S14) and PO error correction (step S15). If ECC error correction is OK, ECC decoding is completed (step S17), and the next step for reading the main data and the ID data can be performed.

If step S16 determines that error correction cannot be performed, the sector out of the 16 sectors for which PI correction could not be performed is extracted (step S18).

Next, at step S19, playback retry conditions are set up. In a playback retry, if data could not be properly played back the same section on the optical disk is read one more time. When performing a playback retry, information can be re-read by simply using the same conditions or information can be re-read using different playback conditions. If playback conditions are to be changed, the system controller 500 can be used to change focusing conditions or tracking conditions in the focus/tracking control circuit 220. Alternatively, the system controller 500 can change the playback sync signal detection conditions in the data demodulator circuit 250. Alternatively, the system controller 500 can change playback equalizer settings in the data demodulator circuit 250. Alternatively, the system controller 500 can change the data slice settings in the data demodulator circuit 250. Alternatively, the system controller 500 can change the speed conditions in the motor control circuit 310.

One of these playback conditions is selected, the sector for which PI correction was not possible is played back, and data demodulation is performed (step S20). Next, PI error correction is performed on the newly read sector (step S21). At step S22, the data from the newly read sector is added to the sector data from the previous read for which PI correction was possible (this data was stored in memory such as SRAM), and PO correction is performed. If error correction is possible, ECC decoding is completed (step S17). If error correction is not possible at step S23, a retry count is stored at step S24 and control returns to step S18. In this case, step S19 will set up a different playback retry condition.

If a predetermined retry count is exceeded at step S24, the system controller 500 determines that an ECC error exists and reports this to a higher-level system.

In this embodiment, if an error occurs only the sector that generated the PI error is re- read. This reduces playback time. Also, the advantages of the method used in this embodiment come into play when different sectors have different optimal values for playback conditions. Not only will this significantly reduce playback retry counts but will also significantly reduce ECC errors. As an example, the optical disk 100 may have a high eccentricity so that the tracking offset conditions allow sectors 0–11 to be played back normally but generate errors for sectors 12–15. On the other hand, a different tracking offset setting may allow sectors 5–15 to be played back normally but generate errors for sectors 0–11. With this embodiment, proper data playback is made possible with one playback retry. With the conventional method, which tries to find conditions that will allow all 16 sectors to be played back in playback retries, the playback retry count will be higher and eliminating errors will be difficult.

Next, another embodiment of the present invention will be described, with references to FIG. 9 and FIG. 10.

Figure 10:
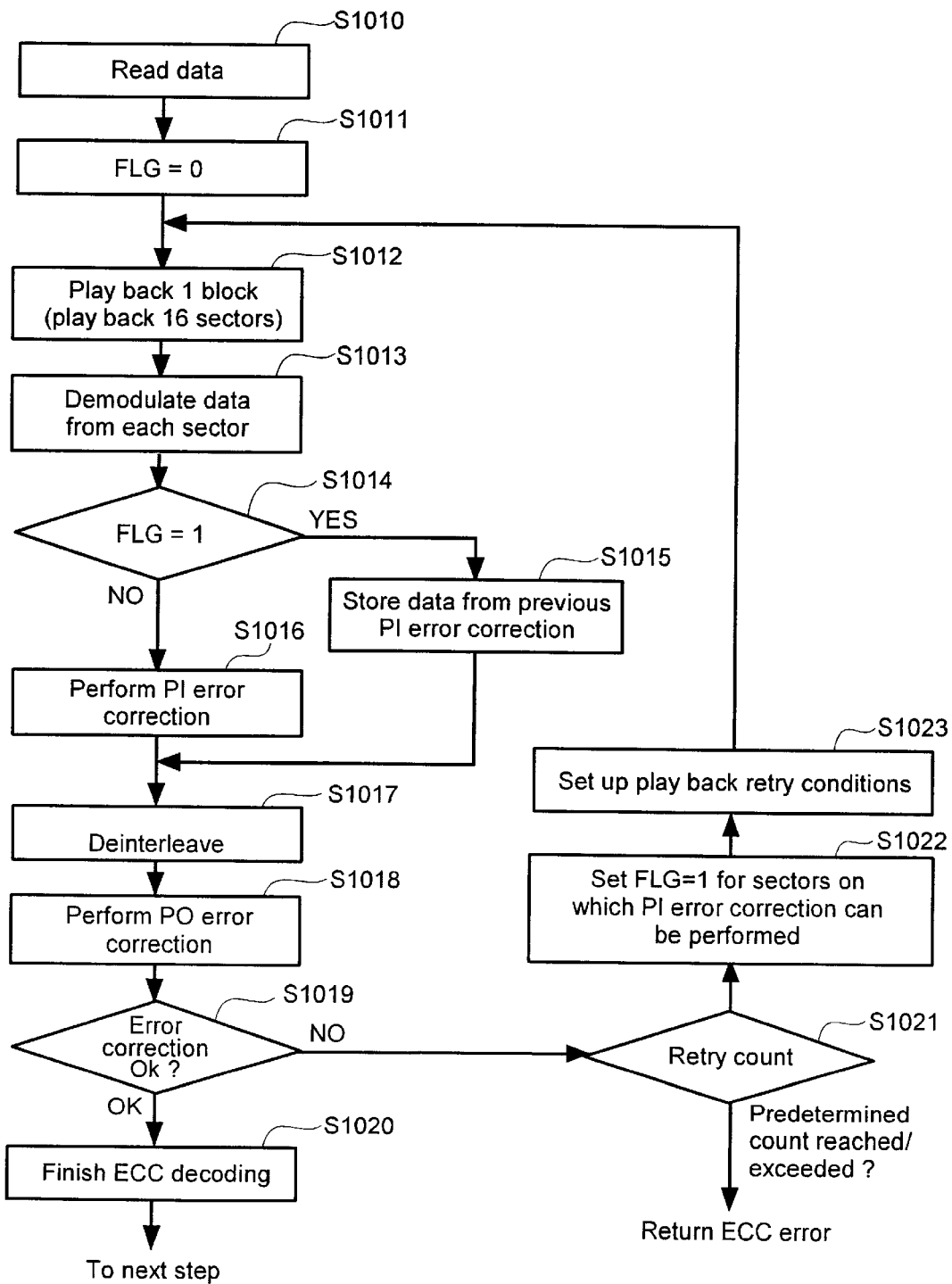
FIG. 10 is a flowchart of a method for playing back data used in another optical disk device according to an embodiment of the present invention.

FIG. 10 is a flowchart showing how data from the optical disk 100 is played back using an optical disk device according to this other embodiment of the present invention. FIG. 9 is a drawing for the purpose of describing this embodiment and shows the relationship between flags (FLG) and sectors.

Referring to FIG. 9, a memory is provided for storing flags (FLG) indicating the PI error correction status of each of 16 sectors and corresponding data. If PI error correction can be performed on a sector, its FLG is set to 1. In the embodiment indicated in FIG. 9, PI correction cannot be performed on sectors 1, 2, 14.

The following description includes references to FIG. 10.

When reading data from the optical disk 100, first all FLGs are set to 0 (step S1011). Next, one ECC block is played back (step S1012), and data demodulation is performed for each of the sectors (step S1013). Next, the FLGs are checked. Since initially FLG=0, PI error correction is performed (S1016). Next, deinterleaving (step S1017) and PO error correction (step S1018) are performed. If ECC error correction is OK, ECC decoding is completed (step S1020), and the main data and ID data are read in the next step. If step S1019 determines that an error cannot be corrected, the retry count is registered at step S1012 and control proceeds to step S1022.

At step S1022, FLG is set to 1 for sectors in which PI correction was possible. Next, playback retry conditions are set up (step S1023). The playback retry condition settings are the same as those from the embodiment shown in FIG. 8.

Next, control returns to step S1012, and the one block (16 sectors) that was played back previously is played back again and data demodulation is performed (step S1013). Next, steps S1014 checks the FLGs. For sectors with FLG set to 1, the previous PI-corrected data is saved (step S1015). For sectors with FLG set to 0, PI error correction is performed. The data for these sectors are descrambled (step S1017), and PO error correction (step S1018) is performed. If ECC error correction is OK, ECC decoding is completed (step S1020) and the main data and ID data are read in the next step. If step S1019 determines that error correction is again not possible, control proceeds again to step S1021. If a predetermined retry count is exceeded at step S1021, the system controller 500 determines that there is an ECC error and reports this to a higher-level system.

In this embodiment, step S1013 is placed before step S1014, but the present invention is not restricted to this, and step S1013 can be placed before step S1016. This has the advantage of reducing playback time since the data demodulation of sectors with FLG set to 1 can be omitted.

According to the present invention, in ECC blocks, playback retries can be performed with modified playback conditions only for those sectors for which PI error correction was not possible. Thus, the number of playback retries can be reduced and the occurrence of ECC errors can be reduced.

What is claimed is:

1. A method for playing back data from an optical information recording medium, the data organized into plural groups, the groups organized into plural blocks, each block having an associated first error correction code for correcting errors in the block, each group having an associated second error correction code for correcting errors in the group, the method comprising:

reading out one of the blocks from the optical information recording medium;

performing a first error correction for the block based on its associated first error correction code;

performing a second error correction for each group based on its associated second error correction code;

storing a result code indicating, for each group, whether error correction is possible for that group; and for each group where error correction is not possible, reading out the group from the optical information recording medium to produce a reread group and performing the second error correction on the reread group.

2. The method of claim 1 further including updating the block by replacing groups therein with the reread groups, and performing the first error correction on the updated block.

3. The method of claim 1 wherein the block is an ECC block, the first error correction is PO correction, and the second error correction is PI correction.

4. The method of claim 1 wherein the step of reading out the group includes altering readout conditions based on the group being read out, the step of altering including one or more of:

changing the focus condition, changing the tracking condition, changing the speed condition, and changing at least one of the sync signal detection condition, playback equalizer setting, and data slice setting.

5. A method for playing back data from an optical information recording medium, the data being organized into a plurality of blocks, each block comprising a plurality of groups, each block having an associated first error correction code for correcting errors in the block by performing a first error correction, each group having an associated second error correction code for correcting errors in the group by performing a second error correction, the method comprising:

reading out one of the blocks from the optical information recording medium;

performing an initial second error correction for each group of the block;

storing a resulting data indicating for each group whether or not the initial second error correction is possible;

performing the first error correction on the block; and if the first error correction for the block is not possible, then:

storing the data of those groups for which the resulting data indicates that the initial second error correction is possible;

rereading the block from the optical information recording medium;

performing an additional second error correction on those groups for which the resulting data indicates that the initial second error correction is not possible; and performing the first error correction for the data of the groups for which the additional second error correction is performed and for the data of the groups for which the resulting data indicates that the initial second error correction is possible.

6. A method for playing back data from an optical information recording medium, the data comprising plural blocks of data, each block comprising plural groups of data, each block having an associated first error correction code used for correcting an error of data in the block using a first error correction, each group having an associated second error correction code for correcting an error of the data in the group using a second error correction, the method comprising:

reading out one of the blocks from the optical information recording medium;

performing the second error correction for each group of the block;

storing a resulting data indicating whether or not the second error correction for each group is possible;

performing the first error correction; and when the first error correction is not possible, then:

storing the data of the group for which the resulting data indicates the second error correction is possible;

rereading the group from the optical information medium for which the resulting data indicates the second error correction is not possible;

performing the additional second error correction for the group for which the resulting data indicates the second error correction is not possible; and performing the first error correction for the data of the group for which the additional second error correction is performed and the data of the group for which the resulting data indicates the second error correction is possible.

7. An optical device for playing back the data from an optical information recording medium, the data being organized into a plurality of blocks, each block comprising a plurality of groups, each block having an associated first error correction code for correcting errors in the block by performing a first error correction, each group having an associated second error correction code for correcting errors in the group by performing a second error correction, the device comprising:

a motor to rotate the optical information recording medium;

an optical head to produce a signal indicative of the information store on the optical information recording medium;

a decoder circuit coupled to the optical head to decode the signal from the optical head and produce data; and a system controller coupled to the decoder and configured:

to control the optical head to read out a block from the optical information recording medium, to control the decoder to produce a decoded signal indicative of the block read out by the optical head, to perform the second error correction for each group of the block, to store resulting data indicating for each group whether or not the second error correction is possible, and to perform the first error correction, wherein when the first error correction is not possible, the system controller performs an additional second error correction based on the resulting data followed by an additional first error correction.

8. The optical device of claim 7 wherein the additional second error correction includes rereading the group from the optical information medium for which the resulting data indicates the second error correction is not possible.

9. An optical device for playing back the data from an optical information recording medium, the data comprising plural blocks of data, each block comprising plural groups of data, each block having an associated first error correction code used for correcting an error of data in the block using a first error correction, each group having an associated second error correction code for correcting an error of the data in the group using a second error correction, the device comprising:

a motor to rotate the optical information recording medium;

an optical head to read a block from the optical information recording medium thereby producing a signal indicative of the information contained therein;

a demodulator circuit coupled to the optical head and to demodulate the signal from the optical head and produce a data; and a system controller coupled to the decoder and configured:

to control the optical head to reread the block from the optical information recording medium, to control the decoder to produce a decoded signal indicative of the block read out by the optical head, to perform the second error correction for each group of the block, to store resulting data indicating for each group whether or not the second error correction is possible, and to perform the first error correction, wherein when the first error correction is not possible, the system controller is further configured:

to store as first data the data of those groups which the resulting data indicates the second error correction is possible, to control the optical head to read out the block from the optical information recording medium, to perform an additional second error correction for those groups which the resulting data indicates the second error correction is not possible to produce second data, and to perform an additional first error correction for the first data and the second data.

10. The optical device of claim 9 further comprising:

a focus control circuit coupled to the optical head and configured to receive the signal to produce a focus control signal under predetermined focus condition;

a tracking control circuit coupled to the optical head and configured to receive the signal to produce a tacking control signal under predetermined tracking condition; and a motor control circuit coupled to the motor to control the motor under predetermined speed condition, wherein the demodulator circuit demodulates the signal under a predetermined sync signal detection condition and a predetermined playback equalizer setting and predetermined data slice setting, wherein prior to rereading the block, the system controller performs at least one of:
changing the focus condition,
changing the tracking condition,
changing the speed condition, and
changing at least one selected from the sync signal detection condition, playback equalizer setting, and data slice setting.

11. The optical device of claim 9 further comprising:

a focus control circuit coupled to the optical head and configured to receive the signal to control the object lens;

a tracking control circuit coupled to the optical head and configured to receive the signal to control the object lens under predetermined tracking condition; and a motor control circuit coupled to the motor to control the motor under predetermined speed condition, wherein the demodulator circuit demodulates the signal under a predetermined sync signal detection condition and a predetermined playback equalizer setting and predetermined data slice setting, wherein prior to rereading the block, the system controller performs at least one of:
changing the focus condition,
changing the tracking condition,
changing the speed condition, and
changing at least one of the sync signal detection condition, playback equalizer setting, and data slice setting.

* * * * *